United States Patent
Hegler

(10) Patent No.: US 8,783,299 B2
(45) Date of Patent: Jul. 22, 2014

(54) METHOD OF AND APPARATUS FOR CONTINUOUSLY PRODUCING A TWIN-WALL PIPE COMPRISING PIPE SOCKET AND TWIN-WALL PIPE

(76) Inventor: Ralph Peter Hegler, Bad Kissingen (DE)

( * ) Notice: Subject to any disclaimer, the term of this patent is extended or adjusted under 35 U.S.C. 154(b) by 1100 days.

(21) Appl. No.: 12/743,341

(22) PCT Filed: Feb. 19, 2008

(86) PCT No.: PCT/EP2008/001273
§ 371 (c)(1),
(2), (4) Date: May 17, 2010

(87) PCT Pub. No.: WO2009/103310
PCT Pub. Date: Aug. 27, 2009

(65) Prior Publication Data
US 2010/0269945 A1 Oct. 28, 2010

(51) Int. Cl.
*F16L 11/00* (2006.01)
(52) U.S. Cl.
USPC .......................................... 138/121; 138/122
(58) Field of Classification Search
USPC .................................. 138/121, 122
See application file for complete search history.

(56) References Cited

U.S. PATENT DOCUMENTS

| | | |
|---|---|---|
| 5,320,797 A | 6/1994 | Hegler et al. |
| 5,346,384 A | 9/1994 | Hegler et al. |
| 5,405,569 A * | 4/1995 | Lupke ........................... 264/504 |
| 6,045,347 A | 4/2000 | Hegler |
| 6,458,311 B1 | 10/2002 | Hegler |
| 7,238,317 B2 | 7/2007 | Hegler |
| 7,600,793 B2 * | 10/2009 | Hegler ........................... 285/399 |
| 7,691,317 B2 | 4/2010 | Lupke et al. |
| 8,178,034 B2 | 5/2012 | Hegler |
| 2004/0016468 A1 * | 1/2004 | Toliver et al. ................. 138/115 |

FOREIGN PATENT DOCUMENTS

| | | |
|---|---|---|
| DE | 20 2007 002 954 U1 | 5/2007 |
| DE | 20 2007 016 630 U1 | 3/2008 |
| EP | 0 563 575 A2 | 2/1998 |
| EP | 0 995 579 | 4/2000 |
| EP | 1 363 766 B1 | 7/2001 |
| EP | 0834386 B1 | 11/2001 |
| EP | 1 612 030 | 1/2006 |

OTHER PUBLICATIONS

International Search Report for PCT/EP2008/001273 dated Dec. 4, 2008 (4 pages).

* cited by examiner

*Primary Examiner* — James Hook
(74) *Attorney, Agent, or Firm* — James B. Conte; Husch Blackwell LLP

(57) ABSTRACT

A twin-wall pipe comprises an internal pipe and an external pipe. The external pipe is corrugated, having elevations and troughs. The twin-wall pipe is further provided with a socket. In a transition portion towards the twin-wall pipe and the socket, provision is made for at least one overflow passage which interconnects the clearance between the external pipe and internal pipe in the vicinity of the transition portion and an adjacent elevation. a≥b refers to the radial height b of the overflow passage relative to its width a in the circumferential direction.

8 Claims, 8 Drawing Sheets

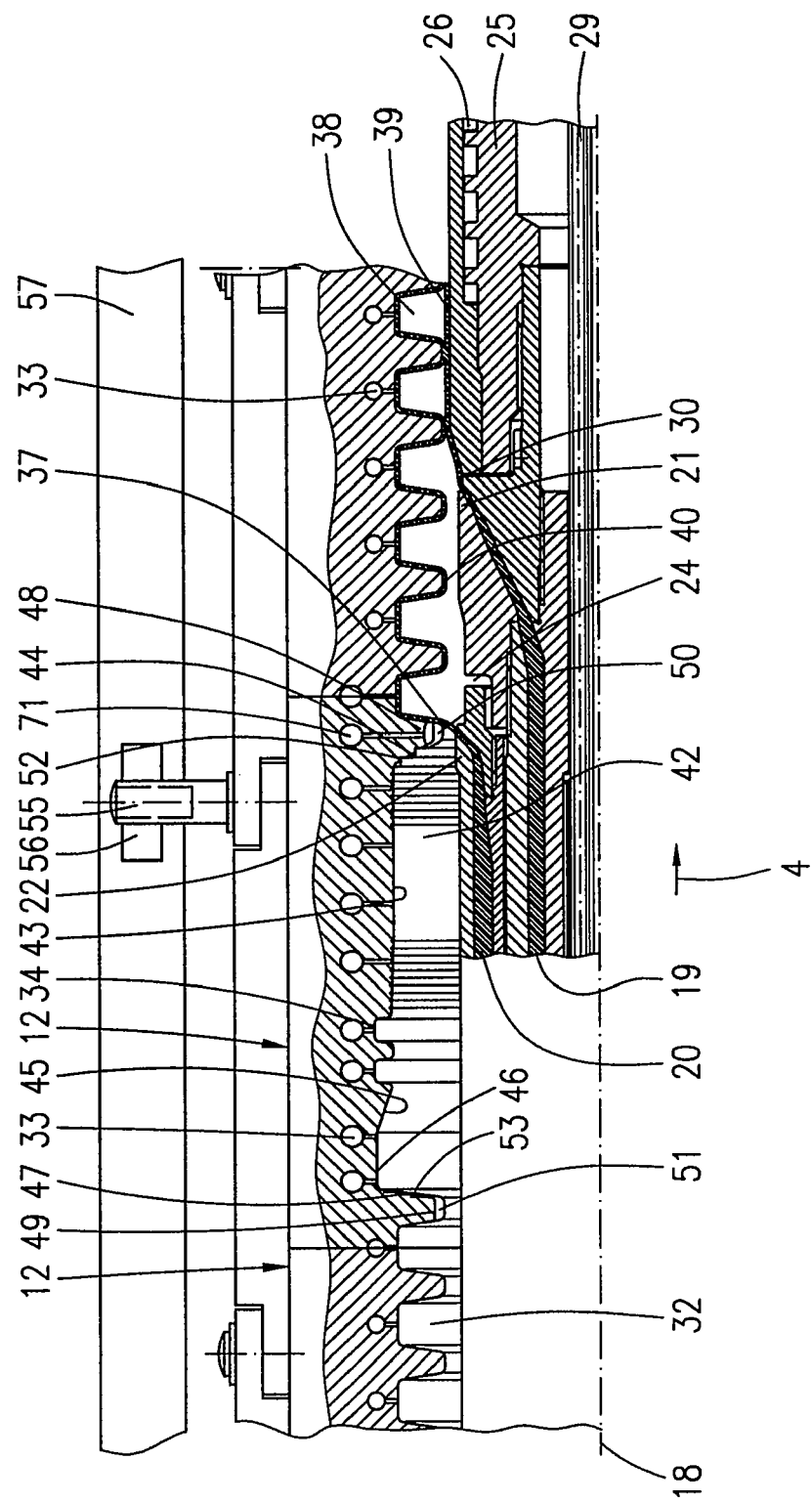

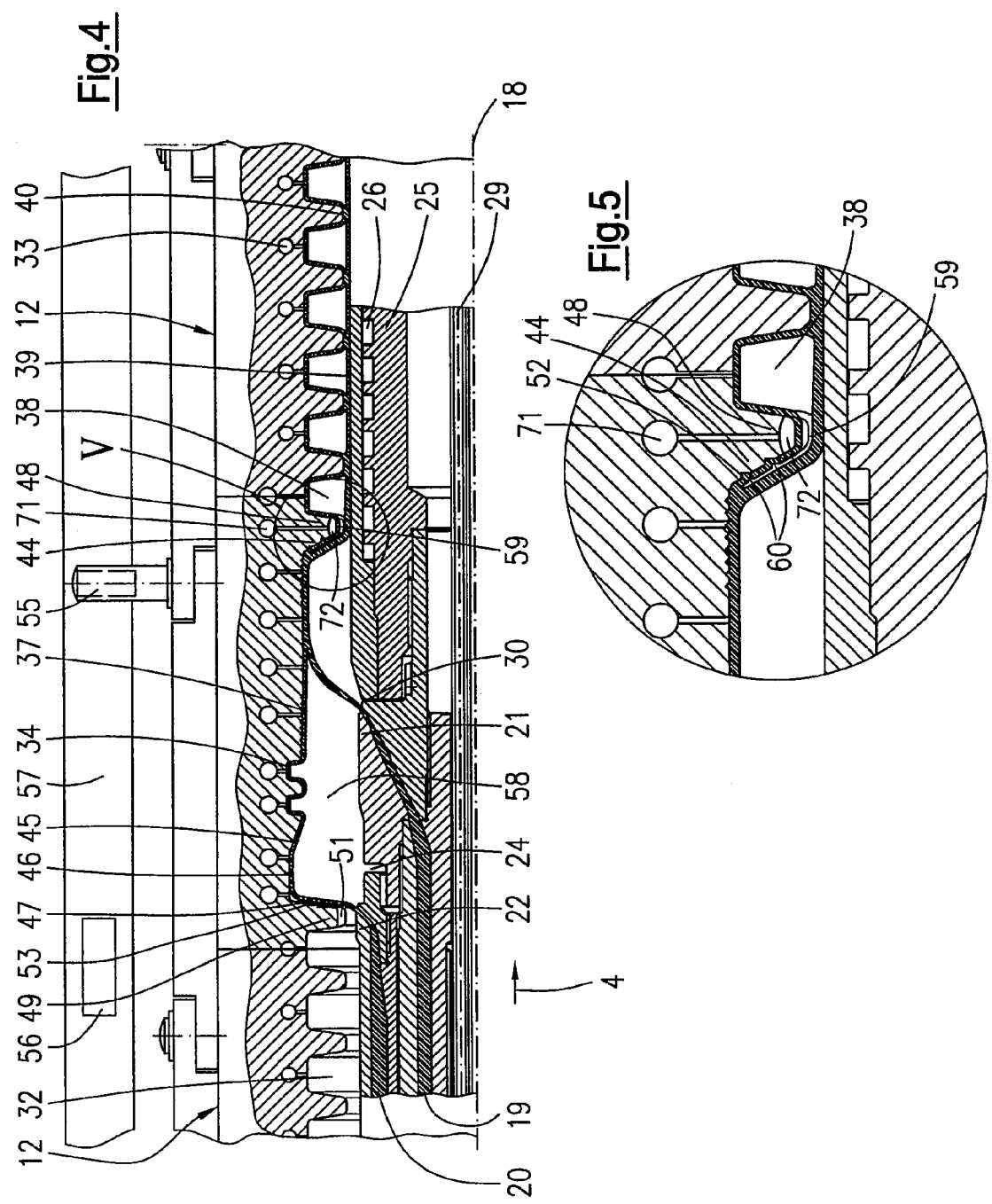

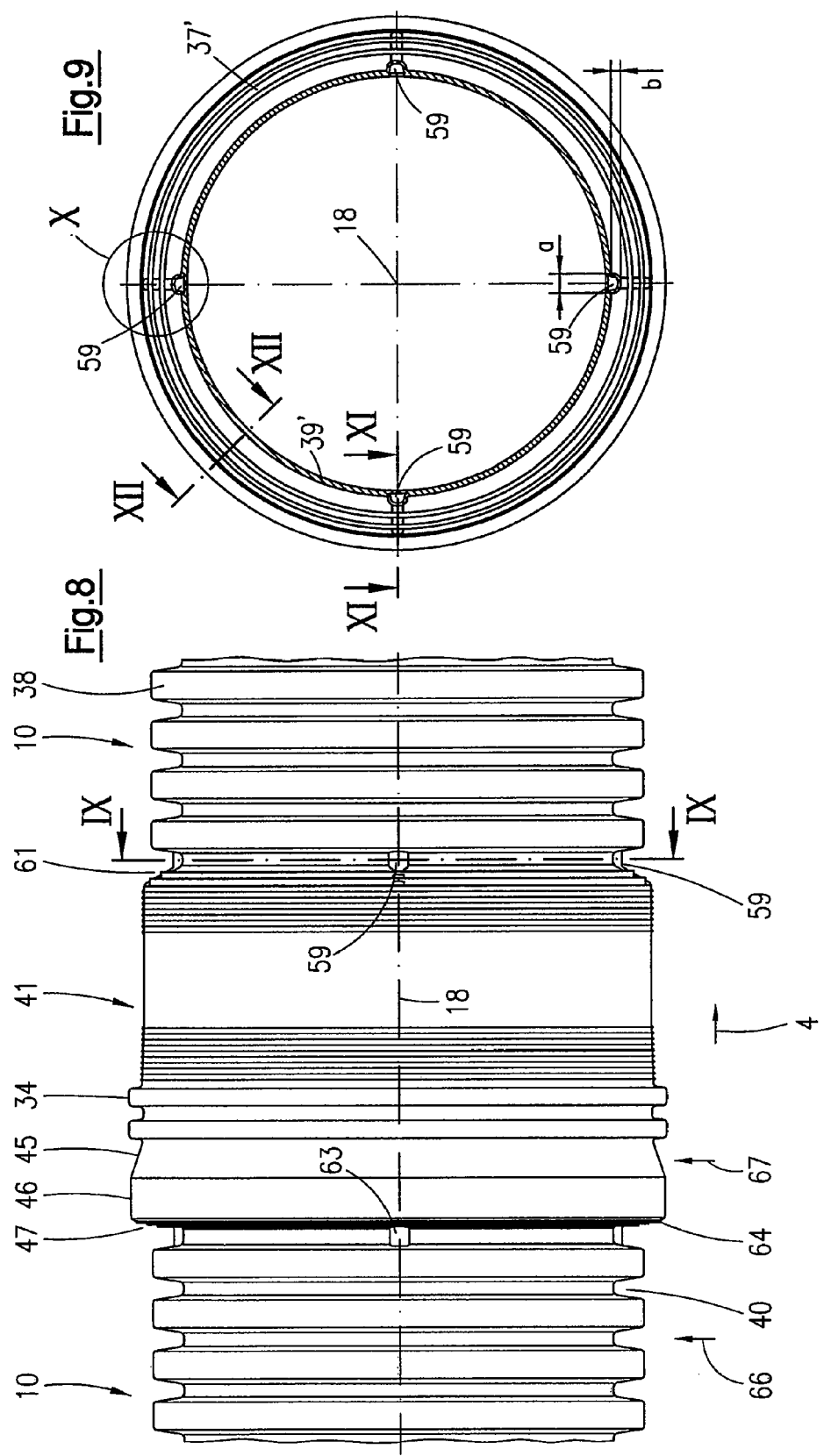

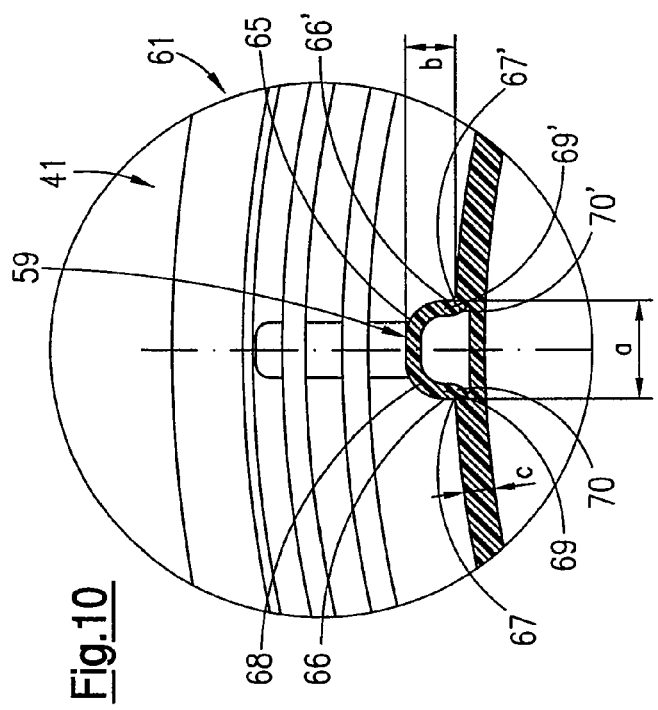
Fig.10
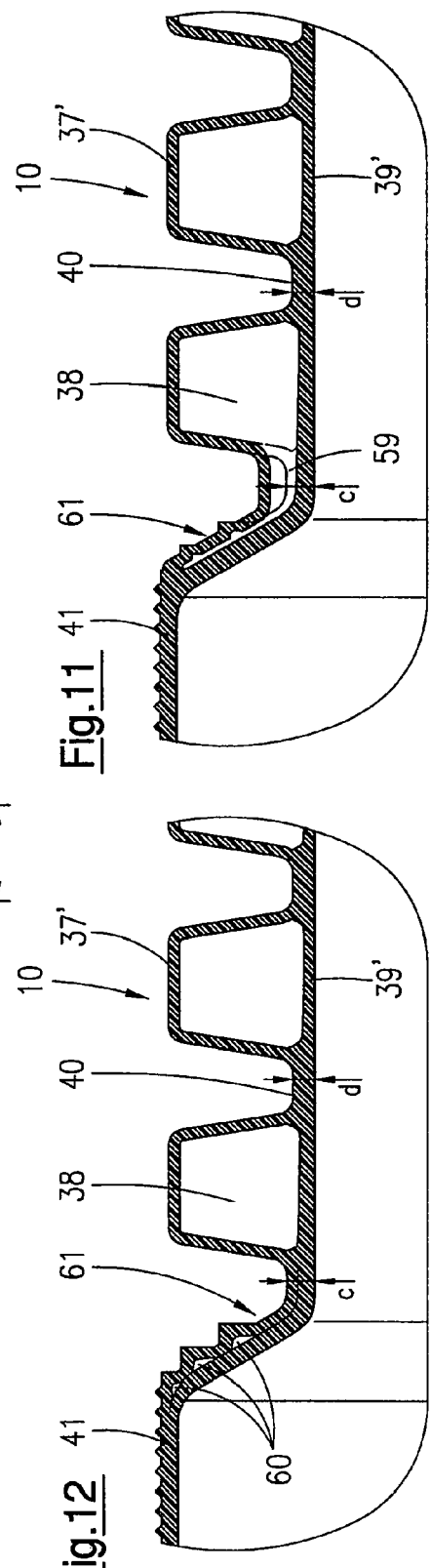
Fig.11
Fig.12

METHOD OF AND APPARATUS FOR CONTINUOUSLY PRODUCING A TWIN-WALL PIPE COMPRISING PIPE SOCKET AND TWIN-WALL PIPE

FIELD OF THE INVENTION

The invention relates to a method of continuously producing a twin-wall pipe in a conveying direction comprising a smooth internal pipe and an external pipe that is united with the internal pipe by welding and provided with elevations with a pipe socket and a central longitudinal axis, the method comprising the steps of extruding an external tube concentrically of the central longitudinal axis, corrugating the external tube with elevations and troughs by partial vacuum applied from outside, extruding an internal tube into the external tube concentrically of the central longitudinal axis, welding together the internal tube and the troughs of the external tube, expanding the external tube at given distances by the partial vacuum being applied from outside, to form an expanded area for a pipe socket to be produced, actuating the internal tube inwardly by gas of a pressure above atmospheric pressure and expanding and pressing the internal tube full face against the expanded area of the external tube for the pipe socket to be finished, and forming a transition portion between the pipe socket and an adjacent trough advancing in the conveying direction, the transition portion being comprised of the internal tube and external tube and directed outwards in relation to the central longitudinal axis, wherein the transition portion, in an area between the internal tube and external tube, is vented into an adjacent elevation by the external tube, in the area of the transition portion, being provided with at least one overflow passage passing through the adjacent trough and extending in the direction of the central longitudinal axis, which—relative to the central longitudinal axis—has a radial outer height b and a width a in a circumferential direction.

The invention further relates to a twin-wall pipe, which is manufactured in particular according to the method of the invention, comprising a central longitudinal axis, a smooth-wall internal pipe which extends concentrically of the central longitudinal axis, a corrugated external pipe, having elevations and troughs between the elevations, the troughs and the internal pipe being welded together, a pipe socket which is molded integrally with the internal pipe and the external pipe, a transition portion between a trough and the pipe socket, the transition portion being formed between the external pipe and the internal pipe, wherein an inside of the transition portion between the external pipe and internal pipe is connected to an adjacent elevation by at least one overflow passage, which—relative to the central longitudinal axis—has a radial outer height b and a width a in a circumferential direction.

Furthermore, the invention relates to an apparatus for putting into practice the method according to the invention and for the manufacture of a twin-wall pipe according to the invention, wherein half shells are disposed for guided circulation in a conveying direction, which are provided with annular mold recesses and which unite in pairs on a molding path, forming a mold with a central longitudinal axis, wherein the mold recesses are connected to partial-vacuum channels in the half shells, wherein an extrusion head of at least one extruder is disposed upstream of the molding path, wherein the extrusion head is provided with an outer die for extrusion of an external tube and, downstream as seen in the conveying direction, with an inner die for extrusion of an internal tube and, at its downstream end as seen in the conveying direction, with a calibrating mandrel, wherein at least one gas duct discharges from the extrusion head between the outer die and the inner die, wherein at least one additional gas duct discharges from the extrusion head between the inner die and the calibrating mandrel, wherein at least one pair of half shells is provided with a socket recess, and wherein a transition area, which is directed outwards in relation to the central longitudinal axis, is formed on an annular rib that is located between the socket recess and an adjacent mold recess advancing in the conveying direction, wherein, a recess is provided in the annular rib, connecting the transition area to the adjacent annular mold recess for generating an elevation, said recess—relative to the central longitudinal axis—having a radial height b and a width a in a circumferential direction.

BACKGROUND OF THE INVENTION

U.S. Pat. No. 7,238,317 describes a method, a twin-wall pipe and an apparatus of the generic type. The greater the nominal widths of corrugated pipes, the more grow the elevations and thus the increase in size of the pipe socket in relation to the inside diameter of the twin-wall pipe. This is due to the fact that the standard twin-wall pipe is very often used as a spigot, meaning that a twin-wall pipe is inserted by its elevations into the socket. The transition portions between the twin-wall pipe that leads during in-line production and the pipe socket on the one hand, and the pipe socket and the lagging twin-wall pipe on the other, possess considerable radial extension. In particular the transition portion between a twin-wall pipe and socket, which remains after separation of the extruded continuous run of pipe, must possess pronounced radial extension i.e., must be directed steeply outwards in relation to the central longitudinal axis, so that, upon insertion of the spigot into the socket as far as to the transition portion, there will be no dead space, nor considerable dead space, where dirt might deposit. The greater the nominal widths and/or the higher the production rate, the greater the risk that the internal tube does not adhere by its full face to the external tube in the vicinity of the transition portion and at the beginning and end of the socket. In order to achieve a full face adherence and thus welding of the internal tube to the external tube the transition section is vented, here, in the area between the internal tube and the external tube into an adjacent elevation by the external tube, in the area of the transition section, being provided with at least one overflow channel passing through the adjacent trough and extending in the direction of the central longitudinal axis. From this solution, which is perfect in its beginning, it has become apparent that under disadvantageous product circumstances the overflow passage does not always show a sufficiently free cross-section for the desired ventilation.

It is an object of the invention to embody a method, a twin-wall pipe and an apparatus of the respective species in such a way that the overflow passage always has a sufficiently free cross-section.

According to the invention, this object is attained by the method of the generic type, in which a≥b refers to the radial outer height b of the overflow passage relative to its width a in the circumferential direction of the external tube.

This object is further attained by the twin-wall pipe of the generic type, in which a≥b refers to the radial outer height b of the overflow passage relative to its width a in the circumferential direction of the external pipe.

Furthermore, this object is achieved by the apparatus of the generic type, in which a≥b refers to the radial outer height b of the recess relative to its width a in the circumferential direction.

The core of the invention is to make the overflow passage and—as a reason for this—the recesses in the half shells in such a way that the overflow passage has a sufficiently big and free through-flow cross-section, wherein, advantageously, the walls are designed distinctively rounded and wherein it is arranged for the forming of the overflow passage to be carried out particularly intensively in the area of the recess of the half shell each by applying partial vacuum.

It can further be advantageous to extend the radial gap width adjacent to the overflow passage such that plastic melt is not squeezed into the over-flow passage.

Further features, advantages and details of the invention will become apparent from the ensuing description of an exemplary embodiment, taken in conjunction with the drawing

BRIEF DESCRIPTION OF THE DRAWING

FIG. 3 is a vertical, longitudinal, sectional view of details of the molding machine during the manufacture of a standard twin-wall pipe;

FIG. 4 is a vertical, longitudinal, sectional view corresponding to FIG. 3 in a position at the start of the manufacture of a socket;

FIG. 5 is an enlarged view of details on the line V of FIG. 4;

FIG. 8 is a view of a twin-wall pipe with a socket produced on the installation;

FIG. 9 is a cross-sectional view of the twin-wall pipe on the line IX-IX of FIG. 8;

FIG. 10 is an enlarged longitudinal, sectional view of the twin-wall pipe on the line X of FIG. 9;

FIG. 11 is a longitudinal, sectional view of the twin-wall pipe on the line XI-XI of FIG. 9; and FIG. 12 is a longitudinal, sectional view of the twin-wall pipe on the line XII-XII of FIG. 9.

DESCRIPTION OF THE PREFERRED EMBODIMENT

Figure 1:
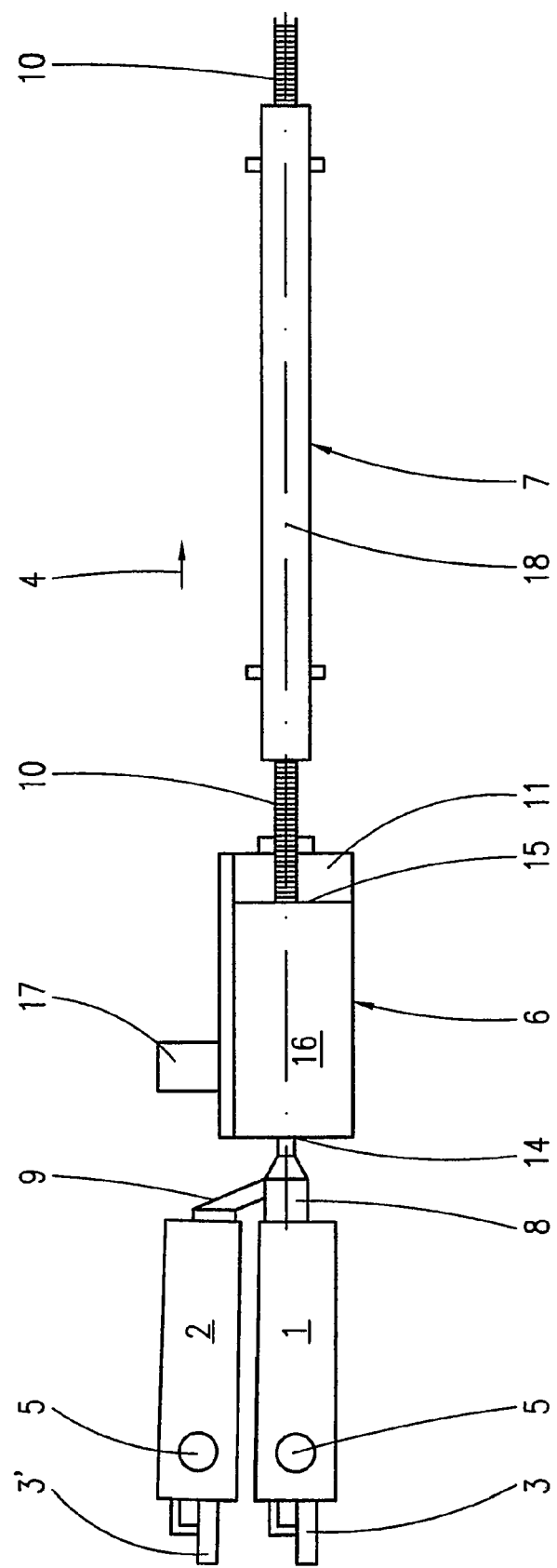
FIG. 1 is a diagrammatic plan view of an installation for the manufacture of twin-wall pipes with sockets, substantially comprised of two extruders, a molding machine and an aftercooler.
Figure 2:
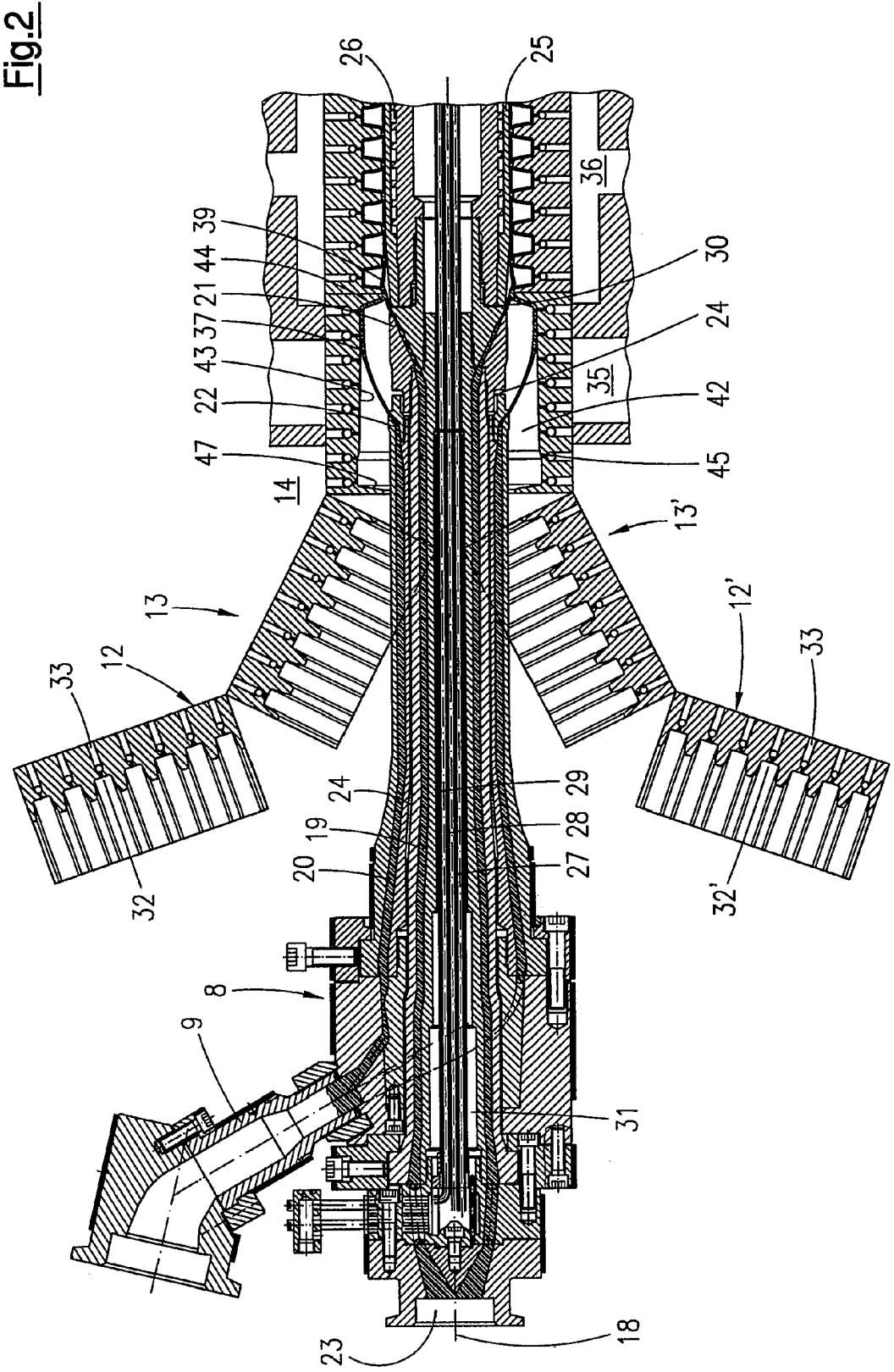
FIG. 2 is a horizontal sectional view of an extrusion head and the inlet of the molding machine.
Figure 6:
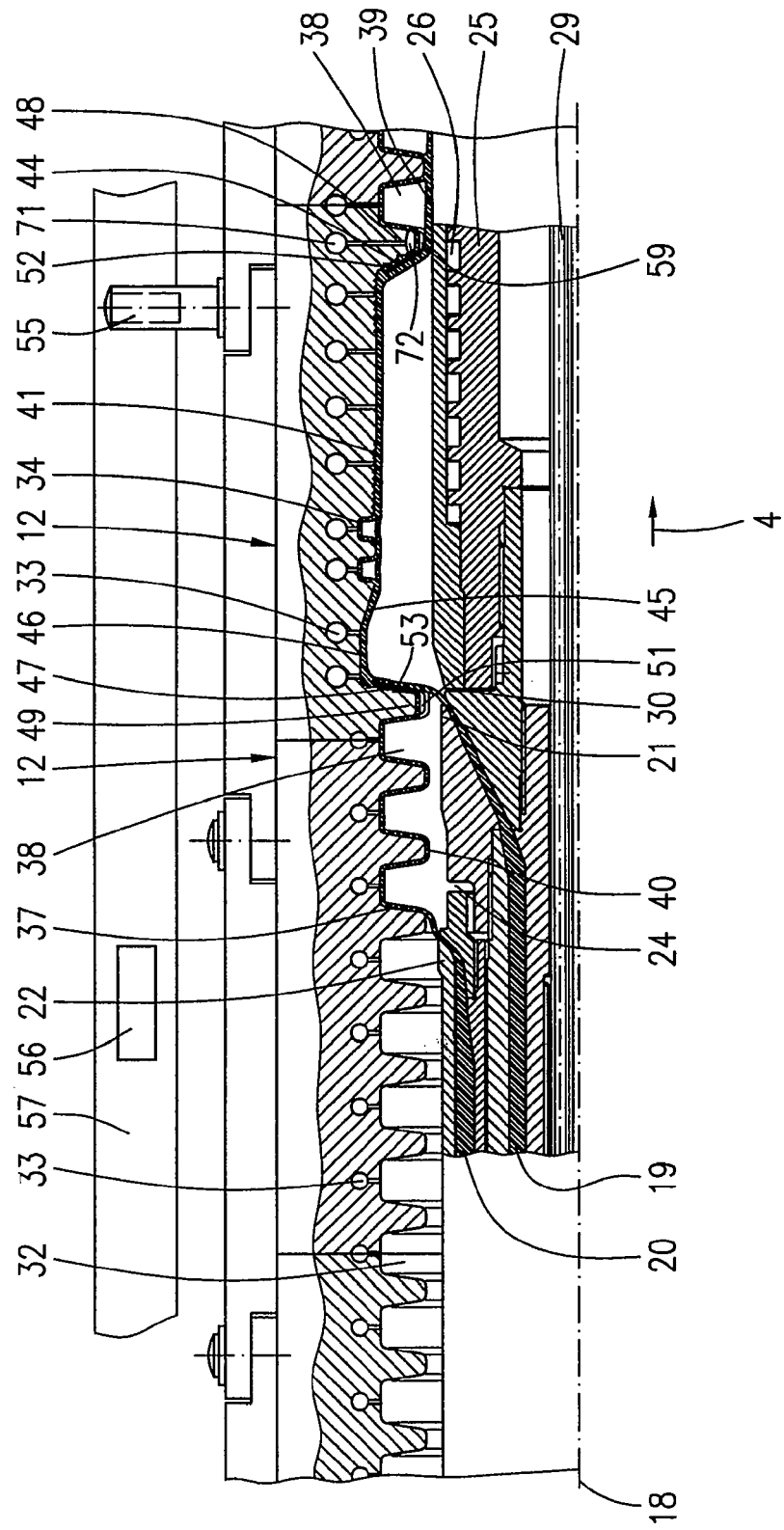
FIG. 6 is a vertical, longitudinal, sectional view corresponding to FIGS. 3 and 4 in a position at the end of the manufacture of the socket.

The installation seen in FIG. 1 for the manufacture of twin-wall pipes comprises two extruders 1, 2. Each of them is driven by a variable speed driving motor 3 and 3' which, related to the conveying direction 4 of the entire installation, is provided upstream of the feed hoppers 5 of the extruders 1, 2.

Downstream of the extruders 1, 2 as seen in the conveying direction 4, provision is made for a molding machine 6, a so-called corrugator, which is followed by an aftercooler 7. A crosshead 8, which projects into the molding machine 6, is mounted on the extruder 1 which is in alignment with the molding machine 6 and the aftercooler 7. The other extruder 2, by the side of the extruder 1, is connected to the crosshead 8 by way of an injection channel 9 which discharges laterally into the crosshead 8. As diagrammatically outlined in FIG. 1, a twin-wall pipe 10 is molded in the molding machine 6; it leaves the molding machine 6 in the conveying direction 4 and is cooled in the aftercooler 7. Downstream of the aftercooler 7, it can then be cut into pieces of appropriate length.

The design of the molding machine 6 is known and common practice. It is described for example in U.S. Pat. No. 5,320,797, to which reference is made explicitly. It substantially comprises a machine bed 11 with half shells 12, 12' disposed thereon, which are joined to each other, constituting two so-called chains 13, 13'. These chains 13, 13' are guided along deflection rollers (not shown) at the upstream inlet 14 and the downstream outlet 15 seen in the conveying direction 4. When circulating in the conveying direction 4, they are guided such that every two half shells 12, 12' are united into a pair, with pairs of shells closely succeeding to each other in the conveying direction 4. A driving motor 17 serves for actuation of the half shells 12, 12' which are united on a molding path 16, forming pairs of shells.

The crosshead 8 comprises two melt channels which are concentric of a joint central longitudinal axis 18, namely an inner melt channel 19 and an outer melt channel 20 which, seen in the conveying direction 4, terminate downstream in an inner die 21 and outer die 22. The inner melt channel 19 is connected to an injection channel 23 of the extruder 1 which is in alignment with the molding machine 6, whereas the outer melt channel 20 is connected to the injection channel 9 of the other extruder 2. Between the inner die 21 and the outer die 22, a gas duct 24 discharges from the cross-head 8, the gas duct 24 on the one hand being connectable by way of a valve to a source of compressed gas for so-called stabilizing air to be blown in or on the other hand to atmosphere or partial vacuum.

A calibrating mandrel 25, which is also concentric of the axis 18, is mounted on the extrusion head 8 at the downstream end thereof seen in the conveying direction 4. It has cooling channels 26 for cooling water which is supplied via a cooling-water flow pipe 27 and led off via a cooling-water return pipe 28. Further provision is made for an air pipe 29 connected to a gas gap 30 which serves as an additional gas duct and, as seen in the conveying direction 4, is located directly downstream of the inner die 21 between the extrusion head 8 and the calibrating mandrel 25. The pipes 27, 28, 29 pass through an approximately tubular supply channel 31 which is provided in the extrusion head 8 concentrically of the axis 18.

The half shells 12, 12' have annular mold recesses 32, 32' that succeed to each other at regular distances, each of them being connected to partial-vacuum channels 33. Upon arrival of the half shells 12, 12' on the molding path 16, the partial-vacuum channels 33 reach partial-vacuum supply sources 35 and 36 so that partial vacuum is admitted to the mold recesses 32.

The plastic melt, which is supplied by the extruder 2 through the injection channel 9 and to the extrusion head 8, flows through the outer melt channel 20 to the outer die 22 where it is extruded, forming an external tube 37. Owing to the partial vacuum, this tube 37 gets seated in the mold recesses 32, 32', forming a tube that is provided with annular elevations 38. Plastic melt is supplied from the extruder 1 through the injection channel 23 to the extrusion head 8, flowing through the inner melt channel 19 towards the inner die 21 where it discharges as an internal tube 39 that approaches the calibrating mandrel 25. The calibrating mandrel 25 expands slightly outwards from the inner die 21 on in the conveying direction 4 until the internal tube 39 bears against the corrugation troughs 40 of the external tube 37 where both of them are welded together. Once cooled and solidified, the internal tube 39 and the external tube 37 constitute the twin-wall pipe 10.

As seen in particular in FIGS. 2, 3, 4, 6 and 7, the half shells 12, 12' are designed for pipe sockets 41 to form at regular distances within the continuous twin-wall pipe 10. To this end, a socket recess 42 is formed in a pair of half shells 12, 12', having a substantially smooth, cylindrical wall 43. A transition area 44 is formed between the wall 43 of the socket recess 42 and the mold recess 32 that leads in the conveying direction 4. The lagging end, as seen in the conveying direction 4, of the wall 43 of the socket recess 42 is followed by peripheral grooves 34 for reinforcement of the socket 41 and a truncated mold portion 45 where an insertion end 46 of the socket 41 is formed, expanding outwards. This is again followed by a transition area 47 that leads to the next mold recess 32 which lags as seen in the conveying direction 4.

As far as described hereinbefore, the apparatus is substantially known from U.S. Pat. No. 6,458,311, to which reference is made explicitly.

As seen in FIGS. 3 to 7, on the transition area 44 that leads in the conveying direction and on the transition area 47 that lags in the conveying direction 4, slotted recesses 50, 51, which run in the direction of the axis 18, are formed in the vicinity of the produced corrugation trough 40 on the annular rib 48 and 49 that forms the respective transition area 44 and 47, of the half shell 12, 12'. These recesses 50, 51 connect the respective transition area 44 and 47 to the next adjacent annular elevation 38. The recesses 50, 51 of each annular rib 48, 49 are interconnected by connecting grooves 52, 53 which extend along the periphery of the respective transition area 44 and 47 and are formed therein.

As seen in FIGS. 3, 4, 6, 7, the half shell 12 that locates the socket recess 42 is sufficiently long for the annular ribs 48, 49 to be completely contained therein. Unlike FIG. 2 which, in this regard, is merely a diagrammatic illustration, the separation of adjacent half shells 12 does not take place through the annular rib 48 and 49, which is advantageous in terms of manufacture. With the socket recess 42 being sufficiently long to reach over more than one half shell 12, then this applies correspondingly to these half shells 12.

By locally defined allocation to the socket recess 42, a rod-shaped switch member 55 is connected to the corresponding half shell 12, operating a switch 56 by means of which to modify the speed and thus the extrusion rate of the extruders 1, 2 and by means of which to supply the gas duct 24 and the gas gap 30. To this end, an arm 57 is mounted on the molding machine 6, running in the conveying direction 4 above the half shells 12, 12'. This is where the switch 56 is mounted which is operated by the switch member 55. As seen in FIGS. 3 to 7, this switch 56 is being operated. The jobs of modifying the speed of the extruder 2 that furnishes the plastic melt for manufacture of the external tube 37, triggering the so-called stabilizing air that flows from the gas duct 24, venting via this gas duct 24, triggering the gas gap 30 at the calibrating mandrel 25, and finally modifying the speed and thus the extrusion rate of the extruder 1 which furnishes the plastic melt for manufacture of the internal tube 39, take place via the software of a control system to which the switch 56, upon operation, transmits a reference signal.

Upon manufacture of the standard corrugated twin-wall pipe 10 in the way seen in FIG. 3 at the right, the external tube 37 is retracted by the partial vacuum into the mold recesses 32 where it adheres. Low overpressure of 0.05 to 0.15 bar above atmospheric is admitted to the gas gap 30. Simultaneously, low, but slightly higher overpressure of 0.2 to 0.3 bar above atmospheric is admitted to the gas duct 24. This low overpressure within the internal tube 39 prevents it from sticking to the calibrating mandrel 25 prior to being welded to the external tube 37. It is just as well possible, instead of overpressure, to apply partial vacuum to the gas gap 30. The slightly higher overpressure between the external tube 37 and the internal tube 39 ensures that the internal tube 39 does not bulge radially outwards into the elevation 38 when the tubes 37, 39, which are welded together at the corrugation troughs 40, cool down to form the corrugated twin-wall pipe 10. Atmospheric pressure between the tubes 37, 39 ensues when they cool down. During this manufacture of the standard corrugated twin-wall pipe 10, the extruders 1, 2 work at a given speed, i.e. they extrude a constant flow of plastic melt per unit of time. Depending on the properties of the plastic melt the internal tube 39 consists of partial vacuum at the calibrating mandrel 25 may help obtain a smooth inner surface of the internal tube 39 and, consequently, of the later internal pipe 39', this being so-called vacuum calibration.

When the transition area 44 moves into the vicinity of the outer die 22 at the instant seen in FIG. 3, the switch member 55 reaches the switch 56, by actuation of which the speed of the driving motor 3' of the extruder 2 decreases, reducing the extrusion rate i.e., the flow of plastic melt per unit of time. As a result of the reduction in speed of the extruder 2, the external tube 37, which gets seated on the transition area 44 and the wall 43 of the socket recess 42 by reason of the partial vacuum, contains less plastic material per unit of length of the twin-wall pipe 10 than in such area of the standard corrugated twin-wall pipe 10 where it is shaped into an external pipe 37' with elevations 38. Depending on the degree to which the speed is reduced, the wall thickness in the vicinity of the socket 41 can be equal to, or greater or less than, that in the vicinity of the elevations 38 of the twin-wall pipe 10. Corresponding adaptation or modification of the wall thickness in the vicinity of the socket 41 can also be attained in known manner by increase of the speed of the half shells 12, 12' that constitute the mold 32. On the other hand, an increase in wall thickness in the vicinity of the socket 41 can also be obtained by increasing the speed of the extruder 2 and, respectively, reducing the speed of the mold 32.

When the transition area 44 reaches the inner die 21, between the illustrations of FIG. 3 and FIG. 4, the overpressure or low pressure of the air that leaves the gas gap 30 is being raised for example to an overpressure of approximately 0.1 to 0.4 bar. Simultaneously the gas-duct-24 overpressure is being cancelled, the gas duct 24 being connected to a vacuum source or to atmosphere, so that the clearance 58 between the internal tube 39 and external tube 37 in the vicinity of the socket recess 42 is being vented. The internal tube 39 is being pressed outwards against the external tube 37.

As seen in FIGS. 4 and 5, the external tube 37 gets seated on the annular rib 48 and the transition area 44, with an overflow passage 59 being simultaneously formed in the vicinity of the slotted recesses 50, leading into the adjacent elevation 38. At the transition area 44, the external tube 37 also gets placed in the connecting grooves 52, thereby forming connecting passages 60 in the molded external pipe 37'. The internal tube 39, by the pressure prevailing therein, is forced against the external tube 37, but it is not pressed or molded into the overflow passages 59 and the connecting passages 60 so that these passages 59, 60 are maintained between the external tube 37 and the internal tube 39. The air located in this area can flow off into the elevation 38 that leads in the conveying direction. In the transition portion 61 between the standard twin-pipe 10 and the in-line molded socket 41, the external tube 37 and the internal tube 39 are being welded together nearly full face. This connection by welding does not exist in the vicinity of the overflow passages 59 and the connecting passages 60. This design enables the transition portion 61, related to the conveying direction 4, to be embodied strongly radial i.e., ascending comparatively steeply.

Directly before the transition area 44 passes the inner die 21, the driving motor 3 of the extruder 1 is triggered in such a way that its speed rises, which means that the flow rate per unit of time of the plastic melt is increased. Consequently, more plastic melt per unit of length is supplied to the internal tube 39 in the vicinity of the transition portion 61 to be produced than in the vicinity of the standard corrugated twin-wall pipe 10 where only the smooth internal pipe 39' is made from it. When the transition area 44 has passed the inner die 21, the driving motor 3 of the extruder 1 is being triggered in such a way that its speed is reduced, yet remaining greater than during the production of the internal tube 39 in the area of the normally corrugated twin-wall pipe 10. Thus, during the production of the socket 41, more plastic melt is extruded per unit of length than during the production of the regular internal tube 39, but less than during the generation of the transition section 61.

When the transition area 47 of the socket recess 42 passes the outer die 22, the extrusion rate of the extruder 2 that delivers the external tube 37 is being set back to the original rate. The extruder 2 again supplies the amount per unit of time of the plastic melt that is necessary for producing the elevations 38. The external tube 37 rests on the transition area 47 and the connecting grooves 53 formed therein, thus producing connecting passages 62 in the external tube. Then the external tube bears against the annular rib 49 and is molded into the slotted recesses 51, forming overflow passages 63.

When the transition area 47 reaches the inner die 21, then the gas pressure that acts at the gas gap 30 is again reduced and compressed air and so-called stabilizing air is admitted to the gas duct 24, which means the process returns to conditions that prevail upon manufacture of the standard twin-wall pipe 10. When the transition area 47 has passed the inner die 21, the driving motor 3 is being triggered, whereby the extrusion rate of the extruder 1 is reduced to the original rate so that again the amount of plastic melt per unit of time is extruded that is needed for manufacture of the smooth internal pipe 39'. As mentioned, the internal tube 39 smoothly bears against the external tube 37 without however being pressed into the connecting passages 62 and the overflow passages 63. In this way, the air in the transition portion 64 between the socket 41 and a lagging standard twin-wall pipe 10, as seen in the direction of conveying 4, escapes into the subsequent elevation 38.

Figure 7:
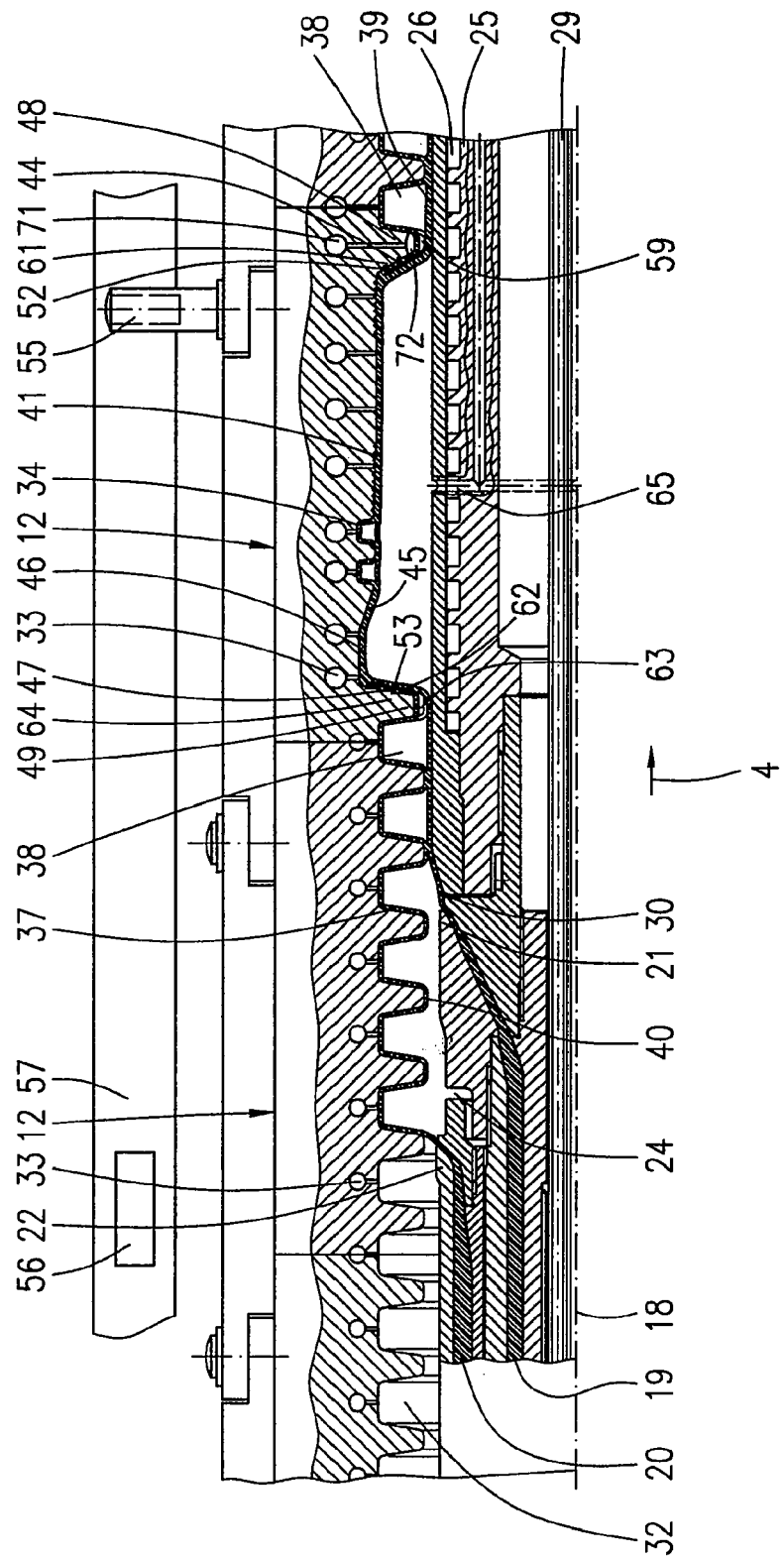
FIG. 7 is a vertical, longitudinal, sectional view corresponding FIGS. 3, 4 and 6 comprising a completion.

As seen in FIG. 7, an additional compressed-air duct 65 can be provided in the calibrating mandrel 25 through which, by corresponding compressed-air actuation, once again to act by compressed air on the internal tube 39 that is still in a condition for molding, as a result of which any air in the vicinity of the transition portions 61 and 64 is led off through the passages 59, 60 and 62, 63 into the adjacent elevations 38. The additional, short-term compressed-air actuation takes place only when the annular rib 48 that leads in the conveying direction 4 as well as the annular rib 49 that lags in the conveying direction 4 and the socket recess 42 there-between are located completely over the calibrating mandrel 25, sealing taking place of the space inside the produced socket 41 in the conveying direction 4 and against the conveying direction 4 by the plastic melt located in the corrugation troughs 40 between the annular ribs 48, 49 and the calibrating mandrel 25. Triggering the compressed air that is supplied via the compressed-air duct 65 takes place in the way described above by way of the switch 56.

The twin-wall pipe of continuous in-line production, illustrated in particular in FIG. 8, is cut through in the vicinity of the transition area 47 that lags in the conveying direction 4, which is implemented by two cuts 66, 67, the cut 66 of which that lags in the conveying direction 4 being made through a corrugation trough 40 after the transition portion 64, whereas the cut 67 that leads in the conveying direction 4 is made along the insertion end 46 of the socket 41.

As far as the apparatus and its mode of operation have been described so far, they are known from U.S. Pat. No. 7,238,317 B1.

Particulars of the slotted recesses 50 and the overflow passages (59) generated therein arise from FIG. 10. At their base, i.e. at the intersection into the partially cylindrical area of the outer tube 37, the recesses, in circumferential direction of the external tube 37, have a width a and a radial height b, wherein a≥b applies. It can further be seen from FIG. 10 that the slotted recesses 50 in the cross-sectional view on their radial outside are designed with an end area 65 connecting the approximately parallel side areas 66, 66' of the recess 50 and passing into them with roundings. The side areas 66, 66', too, pass into the wall of the mold recess 32 by means of partially annular bas areas 67, 67'. In accordance with this form of the recess 50, the overflow passage 59 is designed with a laterally rounded end wall 68, side walls 69, 69' being approximately parallel to each other and partially annular base sections 70, 70', as becomes apparent from FIG. 10, too. In order for the described development of the overflow passage 59 being particularly reliably in accordance with the illustrations in FIGS. 3 to 7 and in particular FIG. 5, an additional partial vacuum channel 71 in the corresponding half shell 12 and 12', respectively, is formed in the annular rib 48—assigned to each slotted recess 50—, said partial vacuum channel 71 having a slotted opening extending approximately over the length of the annular rib 48 in conveyance direction 4 and thus over the length of the slotted recess 50. It is thus achieved that the external tube 37 is reliably pulled into the slotted recess 50 and that thus the overflow passage 59 has a sufficiently big free inner overflow cross-section.

As already shown, the rotation speed of the extruder 1 is already increased shortly before the annular rib 48 passes the inner die 21 with the slotted recesses 50. It is advantageous in this case that, according to FIGS. 11 and 12, the radial gap width c between the calibrating mandrel 25 and the annular rib 48 outside the slotted recess 50 is greater than the radial gap width d between the calibrating mandrel 25 and the mold recess 32 in the area of the troughs 40 to be generated. This expansion in the area of the annular rib 38 ensures the plastic melt not to be pressed into the recesses 50. Thus, as a rule, c>d applies. The wall thicknesses of the twin-wall pipe 10 at the described points correspond to the dimensions of the apparatus as described before.

It is also conceivable, instead of two extruders 1, 2 and a crosshead 8, to use a single extruder and a crosshead as known for example from U.S. Pat. Nos. 5,346,384 and 6,045,347, to which reference is made.

What is claimed is:

1. A twin-wall pipe, comprising:
 a central longitudinal axis (18);
 a smooth-wall internal pipe (39') which extends concentrically of the central longitudinal axis (18);
 a corrugated external pipe (37'), having
  elevations (38) and
  troughs (40) between the elevations (38), the troughs (40) and the internal pipe (39') being welded together;
 a pipe socket (41) which is molded integrally with the internal pipe (39') and the external pipe (37');
 a transition portion (61) between a trough (40) and the pipe socket (41), the transition portion (61, 64) being formed between the external pipe (37') and the internal pipe (39');

wherein an inside of the transition portion (61) between the external pipe (37') and internal pipe (39') is connected to an adjacent elevation (38) by at least one overflow passage (59), which—relative to the central longitudinal axis (18)—has a radial outer height b and a width a in a circumferential direction wherein a≥b refers to the radial outer height b of the overflow passage (59) relative to its width a in the circumferential direction of the external pipe (37');

wherein the overflow passage (59) passes through the elevation (38) in an area of the external pipe (37') in a direction of the central longitudinal axis (18).

2. A twin-wall pipe according to claim 1, wherein at least one connecting passage (60) is provided in the external pipe (37') in an area of the transition portion (61), mouthing into the overflow passage (59) and extending tangentially to the central longitudinal axis (18).

3. A twin-wall pipe according to claim 1, wherein the overflow passage (59) has base sections (70, 70') in the form of divided circles.

4. A twin-wall pipe according to claim 1, wherein the wall thickness c of the twin-wall pipe (10) in the circumferential direction of both sides of the overflow passage (59) is greater than the wall thickness d of the twin-wall pipe (10) between adjacent troughs (40).

5. A twin-wall pipe, comprising:
a central longitudinal axis (18);
a smooth-wall internal pipe (39') which extends concentrically of the central longitudinal axis (18);
a corrugated external pipe (37'), having
elevations (38) and
troughs (40) between the elevations (38), the troughs (40) and the internal pipe (39') being welded together;
a pipe socket (41) which is molded integrally with the internal pipe (39') and the external pipe (37');
a transition portion (61) between a trough (40) and the pipe socket (41),
the transition portion (61, 64) being formed between the external pipe (37') and the internal pipe (39');
wherein an inside of the transition portion (61) between the external pipe (37') and internal pipe (39') is connected to an adjacent elevation (38) by at least one overflow passage (59), which—relative to the central longitudinal axis (18)—has a radial outer height b and a width a in a circumferential direction wherein a≥b refers to the radial outer height b of the overflow passage (59) relative to its width a in the circumferential direction of the external pipe (37'):
wherein the overflow passage (59) is formed by side walls (69, 69') and an end wall connecting the side walls (69, 69') with roundings.

6. A twin-wall pipe according to claim 5, wherein at least one connecting passage (60) is provided in the external pipe (37') in an area of the transition portion (61), mouthing into the overflow passage (59) and extending tangentially to the central longitudinal axis (18).

7. A twin-wall pipe according to claim 5, wherein the overflow passage (59) has base sections (70, 70') in the form of divided circles.

8. A twin-wall pipe according to claim 5, wherein the wall thickness c of the twin-wall pipe (10) in the circumferential direction of both sides of the overflow passage (59) is greater than the wall thickness d of the twin-wall pipe (10) between adjacent troughs (40).

\* \* \* \* \*